(12) United States Patent
Stutz et al.

(10) Patent No.: US 8,848,171 B2
(45) Date of Patent: Sep. 30, 2014

(54) HIGHLY ACCURATE DISTANCE MEASUREMENT DEVICE

(75) Inventors: Reto Stutz, Berneck (CH); Robert Fritsch, Balgach (CH); Juerg Hinderling, Marbach (CH); Marcel Rohner, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 225 days.

(21) Appl. No.: 13/518,540

(22) PCT Filed: Dec. 22, 2010

(86) PCT No.: PCT/EP2010/070604
§ 371 (c)(1),
(2), (4) Date: Jun. 22, 2012

(87) PCT Pub. No.: WO2011/076907
PCT Pub. Date: Jun. 30, 2011

(65) Prior Publication Data
US 2012/0257187 A1    Oct. 11, 2012

(30) Foreign Application Priority Data
Dec. 22, 2009 (EP) ..................... 09180493

(51) Int. Cl.
 *G01S 17/36* (2006.01)
 *G01S 7/487* (2006.01)
 *G01S 17/10* (2006.01)
(52) U.S. Cl.
 CPC ............ *G01S 17/36* (2013.01); *G01S 7/487* (2013.01); *G01S 17/10* (2013.01)
 USPC .......... 356/5.01; 356/3.01; 356/4.01; 356/5.1
(58) Field of Classification Search
 USPC ......... 356/3.01–3.15, 4.01–4.1, 5.01–5.1, 28, 356/28.5
 See application file for complete search history.

(56) References Cited

U.S. PATENT DOCUMENTS

| | | | |
|---|---|---|---|
| 2004/0070746 A1* | 4/2004 | Lewis et al. | ................. 356/5.01 |
| 2008/0304043 A1 | 12/2008 | Benz et al. | |
| 2011/0038442 A1 | 2/2011 | Ullrich et al. | |

FOREIGN PATENT DOCUMENTS

| | | |
|---|---|---|
| WO | 2005/008271 A2 | 1/2005 |
| WO | 2009/095331 A1 | 6/2009 |
| WO | 2009/129552 A1 | 10/2009 |

OTHER PUBLICATIONS

Li Ping et al "Laser Short-Range Detection System Using Digital Processing" SPIE vol. 6622, 66221 (2008) entire document.*

(Continued)

*Primary Examiner* — Luke Ratcliffe
(74) *Attorney, Agent, or Firm* — Maschoff Brennan

(57) ABSTRACT

Highly accurate electro-optical time of flight distance measuring device for determining a distance to a target, including a transmitter for sending out a pulse shaped optical radiation to the target as well as a receiver for an optical signal built for turning the optical signal to an electrical signal, and a filter with a transfer function for filtering the electrical signal whereby the filter is built in such a way that its transfer-function is of at least 4th order, in particular 5th or 7th or higher order, so that aliasing is suppressed. Further a waveform-sampler, as an analog-to-digital-converter, for digitalizing the pulse shape from the filtered electrical signal as time- and value-quantized digital data, and a computation means for a numerical evaluation of the distance according to the pulse shape or a pulse shape representing numerical signature from the digital data.

20 Claims, 8 Drawing Sheets

(56) References Cited

OTHER PUBLICATIONS

European Search Report dated May 31, 2010 as received in application No. 09 18 0493.

Cattaneo, "The anti-aliasing requirements for amplitude measurements in sampled systems", Nuclear Instruments & Methods in Physics Research, Section-A: Accelerators, Spectrometers, Detectors and Associated Equipment, vol. 481, Issue 1-3, Apr. 1, 2002, pp. 632-636.

Markiewicz-Wrzeciono et al., "A simple design program for optimal anti-aliasing filters", European Conference on Circuit Theory and Design, Sep. 5-8, 1989, pp. 294-298.

Ping et al. "Laser short-range detection system using digital processing", International Symposium on Photoelectronic Detection and Imaging 2007: Laser, Ultraviolet, and Terahertz Technology, edited by Liwei Zhou, Proc. of SPIE, vol. 6622, 662221, 2008.

\* cited by examiner

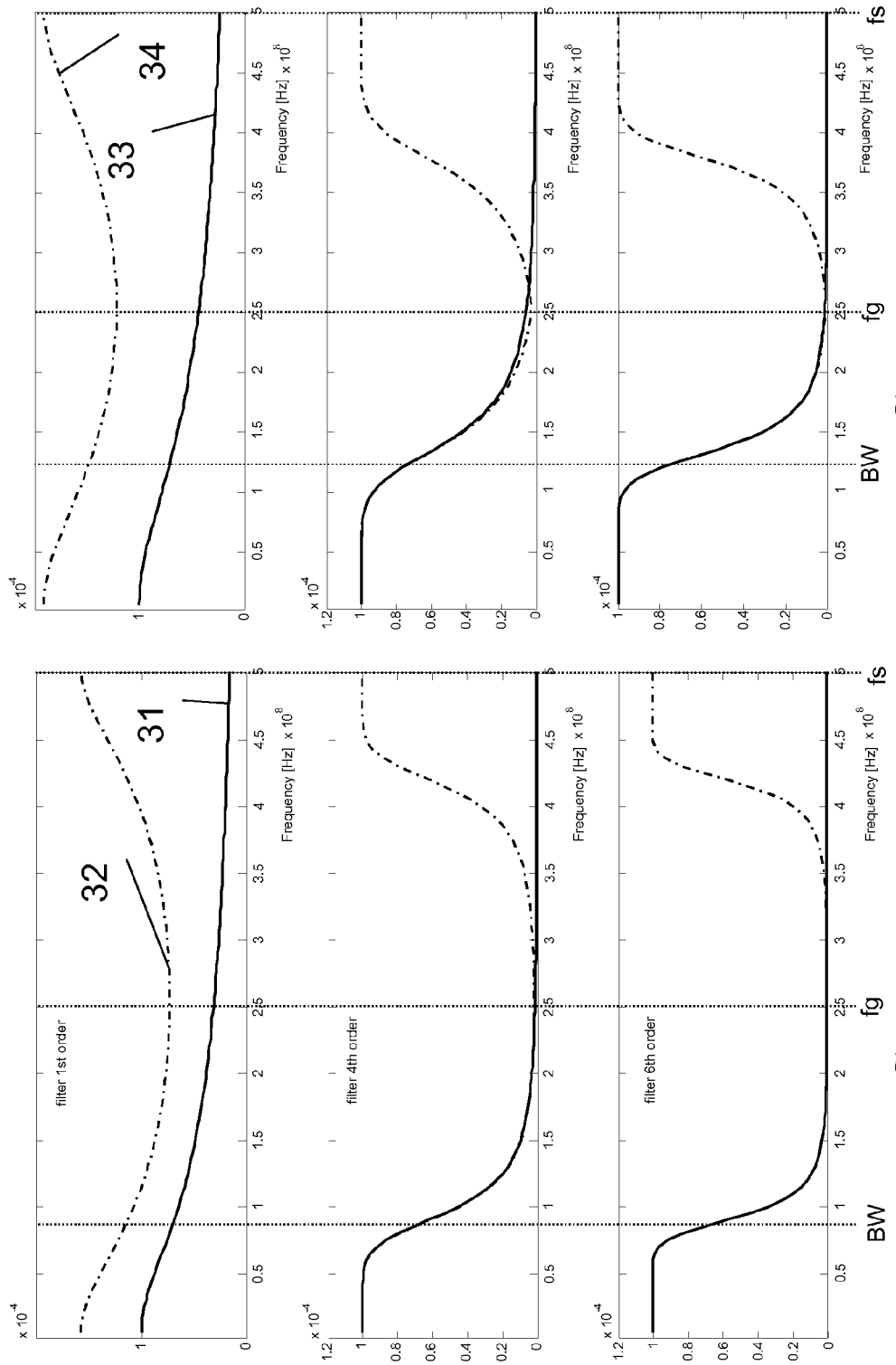

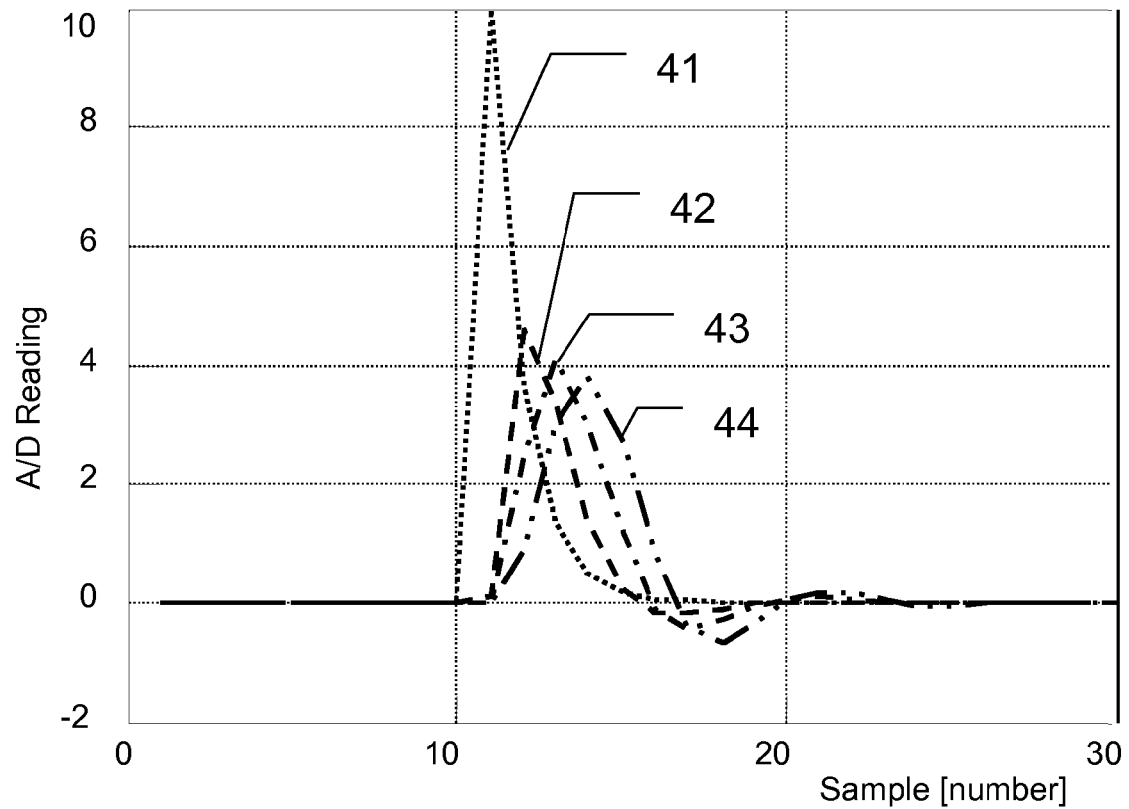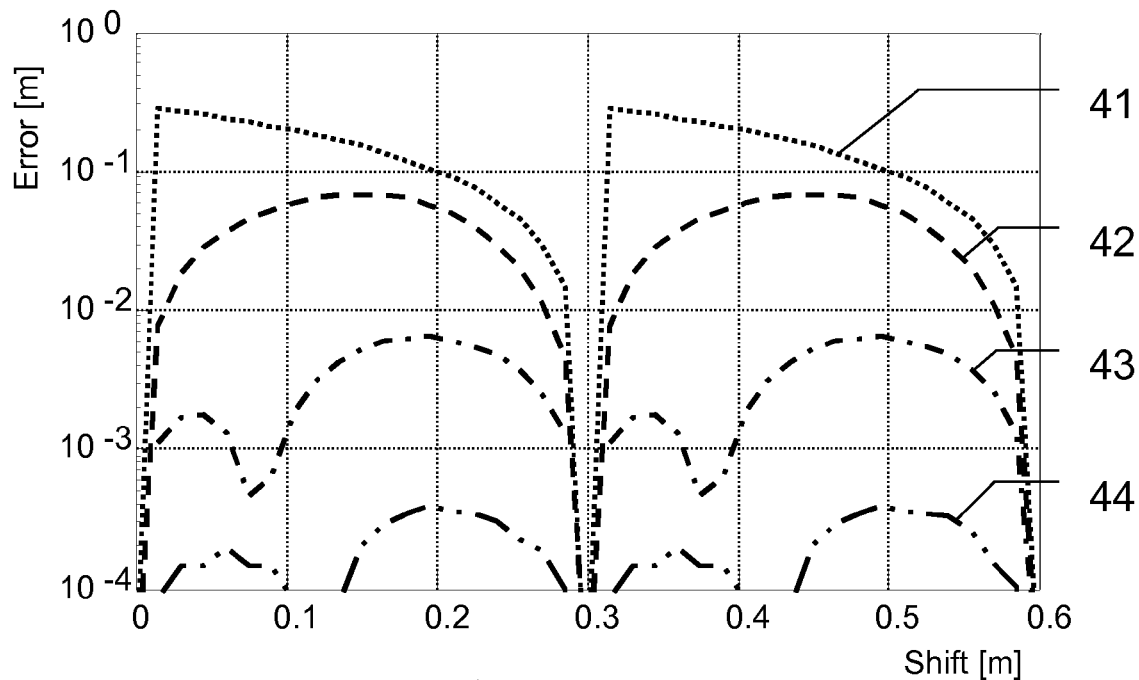
Fig. 4b

HIGHLY ACCURATE DISTANCE MEASUREMENT DEVICE

The present invention relates generally to a highly accurate distance measurement device according to claim 1 and to a method of signal evaluation used therein according to claim 13.

State of the art devices for measuring distances by electro-optical means are mainly based on three measurement principles:
- Phase measurement
- Level-based time of flight measurement
- Sampling time of flight measurement When comparing those three methods, in general one can say that phase measurement provides the highest accuracy, while level-based time of flight measurement provides the fastest results and sampling time of flight measurement has the advantage of the best sensitivity.

By use of the phase measurement it is possible to evaluate the distance based on weak optical signals reflected back from the target of measurement, e.g. on signals within the range of few pico-watts only. On the other hand those systems have the disadvantage of a quiet high loss of signal information by the heterodyne or homodyne frequency mixing that is used in those devices, resulting in quite long measurement time. A further disadvantage is related to the difficulties of handling the often occurring multiple reflections of real-life measurement.

A level-based runtime-measurement is only capable of recognizing reflected signals with amplitude-levels above a certain threshold. Therefore low reflecting or far away targets can not be measured by such a system, as the needed high power light sources such as lasers are technically complex and also expensive. Further, eye-safety regulations are another limiting factor for the power of the laser that can be used.

One of the first distance measurement devices based on the sampling time of flight measurement was described in CH670895. An important aspect therein was to be able to measure distances over long ranges with the low optical power available when ensuring eye-safety. By the sampling method the sensitivity of the receiving electronics could be improved and also a much better signal to noise ratio (SNR) could be achieved. The accuracy of the distance measurement is not in the focus of the teaching therein. As the analog to digital converter (ADC) has only a resolution of four bits the quantification error introduced thereby is likely to limit the accuracy of the distance measurement achievable. Analogue to digital converters (ADC) usually incorporate also the sample/hold unit which is one of the $1^{st}$ steps of the signal digitalisation process.

Also the document DE 36 20 226 suffers from similar drawbacks.

The publication PCT/EP2007/006226 discloses a distance measurement device utilizing the direct sampling of the received signal. Therein the distance is determined by two different approaches in parallel to allowing a wide dynamic range of the input signal and providing reliable results over a wide range of input power.

The international application PCT/EP2008/009010 discloses a device to measure distances with a moving measurement beam, whereby acquisition time and dynamics of the distance measurement are important factors. Such a device can e.g. be used for rotational scanners, profilers or laser-projectors at construction sites, enabling the evaluation of distance information along points of a track which is projected onto a surface. A time of flight measurement is used therein, but there is no information about the accuracy of the distance measurement or any teaching that there is any improvement therein.

Distance measurement devices based on the sampling runtime-measurement are characterized by directly sampling an electronically amplified signal of a reflected pulse of light received by an optoelectronic device such as a photodiode by a quantification of the signal in amplitude and time. Due to that fact, those devices are also referred to as WFD for "Wave Form Digitizer", as the distance-evaluation is based on a digital representation of the form of the received signal.

A typical device for a distance measurement according to the WFD-principle comprises at least:
- A transmitter for optical radiation, usually light-pulses emitted by a laser-diode, onto a target placed in the distance to be measured.
- A receiver for those parts of the transmitted optical radiation that are scattered back from the target to the device. The resulting electrical signal is amplified by some low noise amplifier and fed into a sampling means such as an analog to digital converter (ADC) for further digital evaluation, e.g. in a FPGA, ASIC, uC, uP, DSP or such.

In preferred embodiments, part of the emitted light is also routed on a reference path of known length and then fed directly to the receiver. The reference path can be completely device-internal as well as being at least partially outside of the device e.g. by some reference target fixed to the device somewhere inside or outside of its enclosure. As known in the art, the light pulse that travelled the reference path can be used as a reference pulse for distance evaluation and/or it can also be used for calibration of the signal-amplitudes. As this pulse takes the same signal-path except to the target-distance, environmental influences and nonlinearities of the electronics and optics can be efficiently calibrated out by this.

The digitalized shape of signal-pulses is used to determine the distance. As the device can sample a repeatedly emitted signal more than once and accumulate its digital representation in a correct alignment, it is possible to improve the signal to noise ratio by the square root of the number of accumulations and therefore devices based on the sampling runtime-measurement are able to also work with reflections of low signal strength, e.g. by poorly reflecting or far away targets. By a variation of the number of accumulations it is possible to swap the accuracy of measurement against the time needed for the measurement depending on the needs of the measurement task actually performed.

A WFD can further achieve a good signal-to-noise-ratio (SNR) because of the fact that noise is only evaluated during the short periods of time when also a pulse is present, while during the rest of the time the noise is blanked out. Thereby, the SNR is reduced by the square-root of duty cycle of the optical measurement signal. A low duty cycle also brings advantages concerning eye safety, as described further below.

While the reproducibility of the distance measurement by a state of the art WFD is quite high, the accuracy of the absolute distance is lower than the one achievable by phase-measurement (e.g. often even more than 3 mm). Therefore such a measurement can not be used for high precision rangefinders or geodetic equipment such as theodolites or 3D-Scanners as those devices commonly require a better absolute accuracy.

The distance information is evaluated by determining the travelling time of light pulses sent out by the transmitter and received by the receiver. In a WFD this is done according to the digitalized pulse information of the waveform-sampler (ADC) with appropriate high sampling rate of several 100 Mhz. In a first step this can be done by just recognizing the presence of the pulses, whereupon the travelling time of the light can be estimated within one or a few sampling periods. By this, a first rough distance information with a low resolution is achievable.

The rough resolution has an accuracy dependent on the sampling frequency fs of the ADC, resulting in a time-uncertainty of Ts=1/fs:

$$\frac{2 \cdot TOF}{Ts} = n1 \cdot NR1 + nf1 \quad (1)$$

with TOF representing the "Time of Flight", which is used by the laser pulse to travel forth or back between target and measurement device.

The measurement value nf1 denotes the number of sampling intervals between the start trigger and a characteristic signature of the received pulse of the sampled waveform. The symbol NR1 represents the number of samples in-between two pulses sent by the transmitter. Therefore NR1=1/(Ts*frep1), wherein frep1 is the pulse-rate of the transmitted optical radiation and n1 is the number of pulses travelling in-between the measuring device and the target at the same time.

For short distances n1 evaluates to zero, but if the pulse-repetition-time of the laser is less than the travelling time of the pulses for twice the distance to be measured, more than one pulses are on their way traveling the measuring distance at the same time.

For example, one of the methods, as known from the phase-measuring devices, that allows a determination of this number of pulses n1 can also be applied to the sampling distance-meter. The example further described for illustration is based on using a second emission rate for transmitting the pulses frep2, whereby a second number of sampling intervals nf2 can be evaluated.

A solution for the ambiguity of the distance can then be evaluated according to the formula:

$$\frac{2 \cdot TOF}{Ts} = \frac{nf1 \cdot NR2 - nf2 \cdot NR1}{NR2 - NR1} \quad (2)$$

and the number of pulses n1 at a sending frequency of frep1 evaluates to:

$$n1 \cdot NR1 = \text{round}\left(\frac{nf1 \cdot NR2 - nf2 \cdot NR1}{NR2 - NR1} - nf1\right) \quad (3)$$

The function "round( )", thereby describes the operation of rounding up to the next integer. If n1 is introduced into formula (1) a robust, rough estimation of the distance is accomplished.

To further improve the time- and distance-resolution, certain algorithms—one of those exemplarily described in detail further below—can be used to calculate a sub-sampling-resolution of the signal and get an extremely more precise time-information, resulting also in a distance measurement with a highly accurate resolution in comparison to the sampling rate of the digitalisation.

To achieve an accuracy of the distance in-between the device and the target of e.g. 0.2 mm, a time-resolution of 1.3 ps is needed. Therefore, the ADC would require a sampling frequency of 1/1.3 ps=750*10$^9$ samples per second (750 GS/s). Such sampling rates are beyond of the state of art converters, as nowadays sampling rates of about 100 MS/s to 6 GS/s are common for such devices, wherein MS stands for Mega (10$^6$) and GS stands for Giga (10$^9$ samples). The prices of these devices rise dramatically as sampling speed increases.

To achieve a time resolution of picoseconds for at least one time related parameter of the pulse (e.g. the phase-information) is extracted from the measured signal by calculation. Due to the comparably low sampling rate, the digital data failed so far to represent all information of the received pulse. A complete direct reconstruction of the signal from the digital data is not possible, as the Nyquist-Shannon sampling theorem is not fulfilled. Therefore, many other methods have been developed for signal interpolation in state of the art devices as discussed before.

As known from the state of the art devices, as e.g. described in WO 2009/129552, a lookup-table or lookup-function containing a, preferably monotone, relation of the time related parameter and the sub-sampling time can be used for this purpose. A quite sophisticated task thereby is to generate such lookup-tables or formulas e.g. by system identification or by measurement of reference values in-between the normal sampling intervals, e.g. by shifting the sampling-time in sub-sample steps less than the sampling period.

Another equivalent approach for sub-sampling is also to shift the transmitted signal in time by such sub-sample steps, which often is easier to achieve with the required accuracy. Also this allows measuring the shape of the signal in-between the normal sampling times to get values with sub-sampling time resolution that can be used for generation of the mentioned lookup-tables or -functions.

The fact that the relation between the qualifying parameter and the sub-sampling time is dependent on lots of factors such as temperature, amplitude of the signal, clipping and nonlinearities of the receiver or the amplifier, etc. is a big challenge in such an identification task.

For the evaluation of the fine time resolution for the distance during measurement, there are also many different methods known. The interpolation of the sub-sampling time displacement of the pulses can be achieved e.g. by a cross correlation of two pulses. The disadvantage of this method is that its execution requires serious calculation effort and therefore it is quite slow. Furthermore the results are not unbiased and can comprise offsets.

Other known examples of such methods are interpolations based on one or more known features or characteristic signatures of the pulse shape based on a combination of lookup-tables and calculations. Such a feature of the pulse can e.g. be its centre of gravity, a zero crossing, its turning point of rising edge or an evaluation at different fixed or amplitude-proportional trigger levels.

A big problem with lookup-tables, as discussed above, is that they are only valid for a predefined set of pulse shapes often denoted as reference or calibration pulse. If the actual shape changes—e.g. with a rise of the temperature of the laser, by variation of the supply voltages, by target inclination to the line of sight or by aging—the values of the tables are no longer appropriate and this can lead to serious errors in the resulting absolute distance.

Especially the acquisition of the accurate values for lookup-tables, also called system identification, can be a quite difficult task.

To determine the calibration-tables during production of the device or during its usage in the field also needs lots of time and calculation effort especially as those tables are dependent on the environmental conditions, such as temperature.

A big disadvantage of lookup-tables and related correction algorithms is the fact that the slightest change of the shape of the pulse can lead to an inaccurate relation between the evaluated pulse-time and the true distance. By this approach it is hardly possible to achieve high accuracy and even more difficult to guarantee such. Some of those errors can e.g. be noticed as systematic deviations of the distance, occurring with twice the sampling-rate of the ADC, observed as a period of $3*10^8$ m/($2*$ADC_sampling_rate) in distance.

The article "Laser short-range detection system using digital processing" by LI Ping et al, from the International Symposium on Photoelectronic Detection and Imaging 2007, published in SPIE Vol. 6622, presents a modularized, FPGA and DSP based short-range detection system using a not further specified real-time processing. The system comprises an ADC preceded by a simple three stage filter of $6^{th}$ order for filtering high frequency noise to improve the signal to noise ratio and prevent distortion of signal and also aliasing. This filter has ripples beyond the 3 dB point and an effective attenuation of less than −55 dB and its corner frequency is below ⅛ of the sampling rate.

The document US 2008/304043 discloses a heterodyne mixing of the received signal to lower frequencies, whereby a low speed ADC can be used. The requirements on the filtering after the mixing are also comparably low, as the frequency shift introduced by the mixing is rather big, for example a factor of 128 in the embodiment of this document.

Other known systems, such as e.g. described in US 2005/008271 avoid high frequency sampling and high frequency, high order filtering by the usage of an equivalent time sampling technology to facilitate an economical analog to digital conversion process with low sampling rates. On of the drawbacks in those solution is that many pulses have to be processed by the equivalent time sampling to bring results.

It is therefore an object of the present invention to improve an electro-optical distance measuring device.

A more particular object of the invention is to improve the distance accuracy of a sampling distance measuring device into the ranges of mm or sub-mm, for instance 0.5 mm or 0.1 mm. Such accuracy classes are only achievable by phase-measurement devices or interferometers in prior art.

A future object of the invention is to make WFD-devices more robust and tolerant against changes of environmental conditions and aging.

Another object of the invention is to avoid or at least reduce the dependency on lookup-tables which are stored in memory after an identification process.

A future object of the invention is to achieve an increased absolute distance accuracy over state of the art WFD-devices by simple means which are also easy to implement.

A very special object of the invention is to achieve a better digital representation of the received signal in the WFD to allow higher measurement accuracy.

These objects are achieved by realizing the features of the independent claims. Features which further develop the invention in an alternative or advantageous manner are described in the dependent patent claims.

A distance measurement device according to the present invention does not rely as strongly on a lookup-table or -function storing information about an identified shape of a received optical pulse, as known from prior art.

This is achieved in an easily implementable but highly effective way as presented below:

Introducing a filter of high order into the signal path leads to an unexpected improvement of accuracy of the measured distance, in particular the absolute distance values. The high order filter is e.g. a filter of $7^{th}$ or higher order—which is much more than the simple noise suppression filters of $1^{st}$, $2^{nd}$ or maybe $3^{rd}$ order as known from the state of the art devices.

If the bandwidth of the received signal is reduced before sampling so that all of the distance relevant frequencies are below half of the sampling-frequency used for time-quantification in the ADC the Nyquist-Shannon theorem is fulfilled and an exact reconstruction of the shape of the signal based on the sampled digital data is possible. By a digital representation of the signal that allows a complete reconstruction of the shape of the signal, the exact time-position of the pulse, also at any time point in between the signal samples, can be evaluated with much higher accuracy. Thereby, the complete reconstruction of the signal into sub-sample-resolution does not necessarily need to be numerically executed, as only the pure fact of theoretical reconstructability of the data can be sufficient for improving the accuracy of the results in the further processing of the data.

As an example, reconstruction of the pulse shape can be achieved for every time instant between the sample points of time $n*Ts$ by the equation $s(t)=\Sigma(s(n)*sinc(\pi*(t-n))$ whereas $\Sigma$ means the sum over some relevant sample points and sinc is the function $sin(x)/x$. The time t is given in units of the sampling time Ts and t is the resampling-time-point which can be in-between the sampling-times. With today's processing capabilities the resampling can be done in real time, that means signal processing can be implemented in streaming mode.

In other words, resampling is based on a numerical reconstruction of amplitude values of the pulse shape from the digital data which was sampled at discrete times with the sampling rate of the ADC, whereby a resolution in time and/or amplitude is higher than the one of the sampling ADC. As known in the art, it is also possible to first reconstruct the waveform with a higher resolution in time and then again taking only certain samples out of the reconstructed waveform, which is in particular useful if the original and desired sampling rate are not direct multiples of each other. It is also possible to reconstruct a waveform and sample it again with the original sampling rate, but shifted in time, at new sampling-times being in-between two of the original samples. At least theoretically, this can even be done without loss of information. Nevertheless, the information content, which can be represented by the bandwidth of the sampled signal, remains and is limited by the so called Nyquist-Frequency and the quantifying value-resolution of the sampled amplitude.

To achieve a valid reconstructability, at least the dominant part of the signal at the ADC must be inside the Nyquist-band, preferably but not necessarily inside the first Nyquist-band. This works independent of the shape of the pulses and the accuracy of the runtime-measurement can be highly improved by this.

In comparison thereto, the sampling distance measurement devices according to the state of the art are using a filter-chain that does not satisfy the Nyquist-Shannon theorem. The corner frequency fg (or $f_{3\ dB}$ as it is characterized by a damping of −3 dB) used for limiting the spectrum of the signal are of low order type with a gentle slope in the frequency range. For frequencies above fg they achieve only a low rate of suppression and as the Nyquist-Shannon theorem is not completely fulfilled, this leads to aliasing effects in the digital data which hinder the exact reconstruction and an accurate distance measurement.

For example DE 10 2005 033 403 also contains teaching about the accuracy problems related to aliasing, but it comes up with a quite complicated solution of introducing artificial aliasing into a stored reference signal. Aliasing is presented as an unavoidable fact that can not be overcome and its influence to the distance accuracy can only be bypassed by some sophisticated evaluation method, instead of avoiding aliasing at first hand as in the present application whereby the evaluation can be much simpler and also more robust.

Often the corner frequency or bandwidth is not even near the Nyquist-criterion for the sampling-frequency as the primary intent of the filter is only to cut undesired noise from the high frequency range and/or to suppress DC-biasing.

The usage of only low order filters also seems obvious, as it is commonly known that filters of high order tend to introduce quite serious distortion of the signal in time domain. As the time of flight information is a time-domain value, it seems obvious to try to avoid such distortions as much as possible. Otherwise, an accurate measurement of a time domain parameter of the signal does not seem possible as the shape of the signal is distorted.

For example in document US 2004/0070746, the shown pulses have unipolar shape, which is a typical response at the output of a common low order signal filter having a frequency response with low edge steepness.

Therefore the anti-aliasing-filters used in prior art are of low order, $1^{st}$, $2^{nd}$, maybe $3^{rd}$ with the design-goal of keeping the deformation of the signal as low as possible. Sometimes their main purpose is only to improve the SNR by suppressing high frequency noise rather than being designed for avoiding aliasing at all.

Another aspect is the fact that in general the design of stable analog filters of high order is a sophisticated task, as they are known to tend to be unstable in time and temperature if not designed properly and being built with also quite pricey low tolerance electronic components. Sometimes the circuit must even be fine-tuned while commissioning.

Implementing such a filter into a waveform-digitizing distance measurement unit does not seem to be desirable since a close look at the transfer functions of such high order frequency-filters does not raise any expectation that such a filter can be of any help for achieving a more accurate measurement of a time signal. Those transfer functions often suffer from a quite high gain ripple and they are known to result in ringing and post-pulse oscillation effects in time domain. A technician can explore those distortions easily e.g. by an oscilloscope, and the signal shown there will undoubtedly prove to him that those filters are undesirable for an application wherein time-domain-signals have to be analyzed.

Also the non linear phase-response, known from filters with steep slopes, is known to result in a variation of the envelope-delay that introduces distortion in the time-signal.

In contrast thereto, the present invention introduces high order filters in the signal path anyway to get rid of a problem that—although it can not be obviously expected—has proved to be more dominant in this application: The aliasing-effect.

As known from theory (e.g. from the books of Robert J. Marks: "Introduction to Shannon sampling and interpolation theory"—Springer Verlag 1991 or "Advanced topics in Shannon sampling and interpolation theory"—Springer Verlag 1993) a complete and correct reconstruction of a digitalized signal is only possible if the signal comprises no frequency higher than half of the sampling frequency. All spectral components of the signal having a higher frequency than fg are folded back into the Nyquist-band by the sampling process. This can introduce serious errors, in the amplitude as well as in the phase of the signal.

An aspect why this relevance is not obvious at first hand is also the fact that aliasing can hardly be seen when looking at a time-domain signal as an engineer tends to do in practice.

Another way to interpret the effect of the invention is that not the actual shape of the pulse is evaluated, but the shape as formed by the filter or the signal path comprising all filter elements. As long as the pulses are filtered in the same manner, a distortion does not really matter as long as it is common to all pulses and there is no invalid information added as by aliasing. Although the shape of the pulse is changed by the filter, an accurate measurement of the timing is still possible and even improved thereby. The matching of two pulse-shapes (or shape-representing features or signatures) being compared to each other is highly improved by the invention, even with the thereby introduced loss of some knowledge about the shape of the actual pulse by cutting of higher frequencies. Another expression for matching could be a finding of similarity between two pulse-shapes which are represented by the digital data, quasi a best fit in overlaying two pulse shapes.

As the actual shape of the pulse isn't the dominant cause of distance-errors any more, the requirements for the pulse-shape identification and its representation in lookup-tables can be loosened. Thereby the whole device is getting much more robust against environmental changes such as temperature, aging, target properties, etc.

By usage of a high order filter with steep slopes in the frequency-domain near the cut-off frequency, the loss of useful information of the signal that is introduced by the damping of the filter can be minimized, as only those frequencies which do not contain much usable information but bring signal-distortion due to the aliasing effect are suppressed by the filter.

The distance measurement device according to the invention and the method of signal evaluation according to the invention are described or explained in more detail below, purely by way of example, with reference to working examples shown schematically in the drawings. Specifically, FIG. 1 schematically shows an example of a typical WFD distance measuring device according to prior art;

FIG. 2a schematically shows an exemplary embodiment of a WFD distance measuring device with a filter according to the present invention, wherein only the most important parts that are needed to explain its function are shown;

FIG. 2b schematically shows a further exemplary embodiment of a WFD distance measuring device with a filter according to the present invention, wherein both, the output and the input signal, are shaped by a filter;

FIG. 3a shows a comparison of the frequency domain signals with different orders of filters to illustrate the effect of the invention;

FIG. 3b shows a comparison of the frequency domain signals with different orders of filters to illustrate the effect of the invention with an increased bandwidth compared to FIG. 3a;

FIG. 4b shows a comparison of the time domain signals with different orders of filters and the periodical interpolation errors achievable to illustrate the effect of the invention with an decreased bandwidth compared to FIG. 4a;

FIG. 6b shows a diagram of the damping factor at Nyquist frequency for different orders of the filters used for calculation of the curve in FIG. 6a;

The diagrams of the following figures should not be considered as being drawn to scale.

Figure 1:
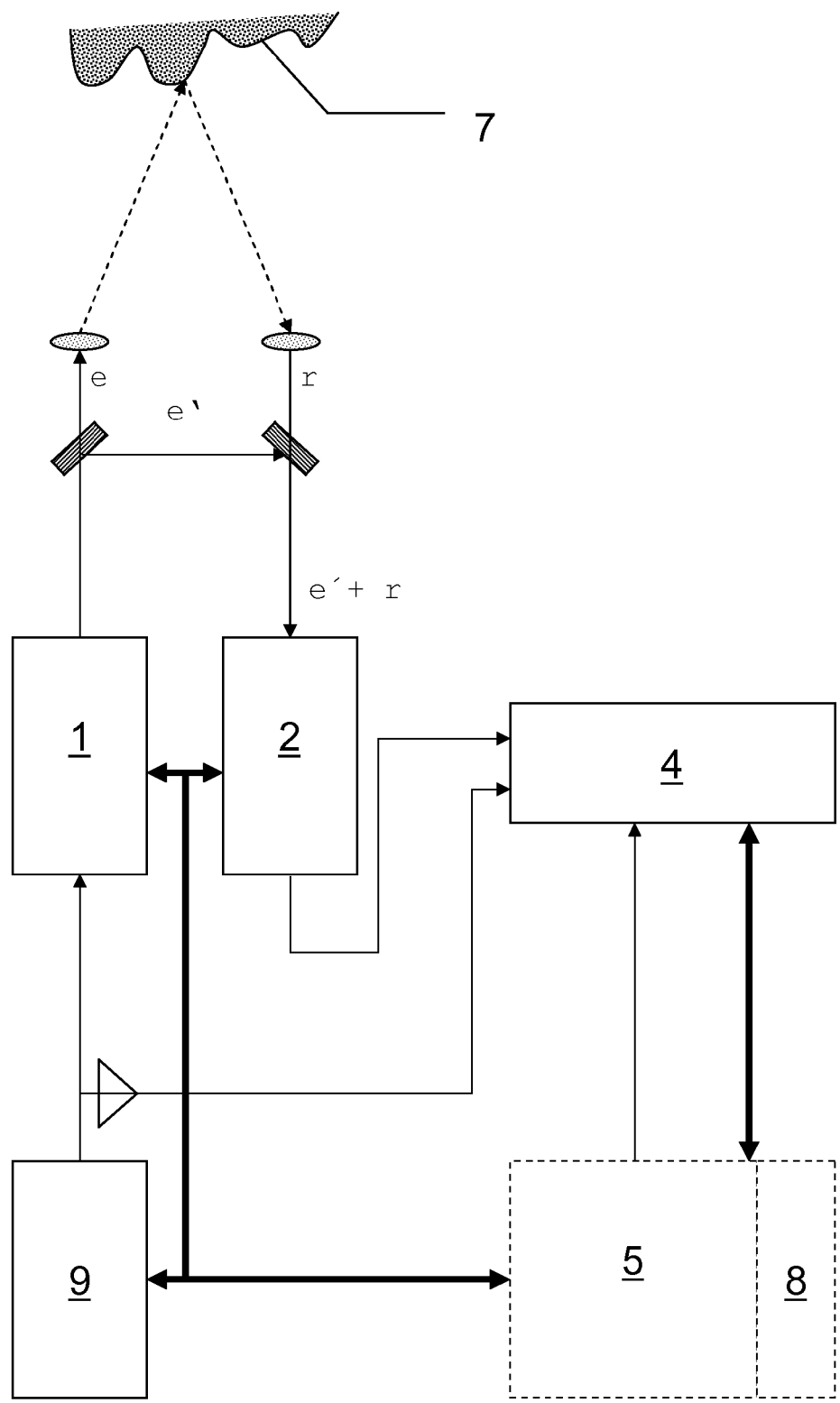

FIG. 1 shows an example of a distance measurement unit known in the prior art. To illustrate the basic principle of operation of a WFD, only the therefore relevant parts are schematically drawn.

A transmitting unit 1 is sending out light pulses e controlled by a controller-unit 5 and an output driver 9. In most embodiments, a laser-diode is used for generating those light pulses and some optics is used to collimate the laser beam. As symbolized, part of the emitted light e' is separated, as the main beam of light is transmitted by some optics towards a target 7 that is located in the distance to be measured.

The target 7 is reflecting at least part of the light r back towards an optical receiver 2, usually focused by some optics in between. The signal e', which has travelled a known reference path, is also applied to the receiver 2, which e.g. can be a photodiode, to get an corresponding electrical signal for further proceeding.

The electrical signal needs amplification by an amplifier. Such amplification can e.g. be achieved by an electronic amplification stage and/or by an avalanche photodiode (APD) or both. In the figure, the amplification is included in the receiver 2, whereas no explicit block for the amplification is drawn. As an example, a circuit as presented in EP 2 026 479 can be used.

The resulting electrical signal is digitalized by a high speed analog to digital-converter (ADC) 4 for sampling the shape of the received pulses. Thereby, a digital representation of the shape of the amplitude of the signal, especially of the shape of the received optical pulse, is generated by the ADC by sampling and digitalizing the value of the amplitude-level at a certain resolution (e.g. 4 to 24 bits) in a periodic sampling time interval (=1/sampling rate).

Out of these digital data the controller-unit 5 determines the distance as discussed above based on some lookup table stored in a memory 8 inside or outside of the controller-circuit 5. For high speed or real-time data-processing, the controller-circuitry comprises at least a FPGA, an ASIC, or an appropriate DSP or high performance µP.

Examples of further prior art embodiments of such devices can be found e.g. in WO 2008/009387 or EP 1 912 078 A1.

Figure 2A:
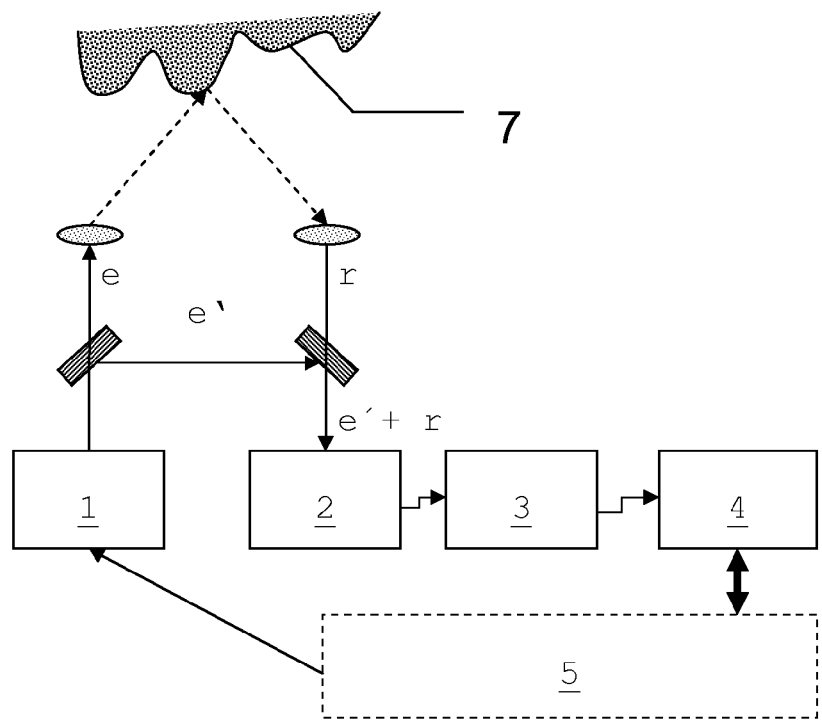

FIG. 2a shows the distance measurement device according to the invention. Its structure is similar to the one of FIG. 1, except for the presence of a high order filter 3.

In particular it shows a highly accurate, electro-optical time of flight distance measuring device for determining a distance to a target 7 according to the present invention. It comprises a transmitter 1 for sending out a pulse shaped optical radiation e to the target 7, in particular as a pulse modulated laser beam from a laser diode, a Q-switched micro-chip laser or fiber laser. In case of very high precision range finders, the emitter can be a LED.

It comprises a receiver 2 for an optical signal which signal comprises parts of the optical radiation r, scattered back from the target 7, that is built for turning the optical signal to an electrical signal, such as a photodiode or avalanche photodiode. Further, a known reference path that is designed for guiding a part e' of the emitted radiation e to the receiver 2 can be comprised in addition.

What is not shown in FIG. 2a is that the optical radiation portions from the path r and that from the path e' can be admitted to the optical receiver either simultaneously or separately, depending on measurement mode. In case of simultaneous admission, there is only a single sampled signal sequence which comprises two pulse-like waveforms, whereas for the sequential case two independent waveforms are recorded.

A filter 3 with a transfer-function for filtering the electrical signal, such as an analog-signal lowpass- or bandpass-filter is applied to the electrical output signal of the receiver. The filter block 3 can be setup of several stages comprising filters and amplifiers. Principally most amplifiers may be considered as a filter depending on its feedback network. Practically, blocks 2 and 3 can be merged, the spectral characteristics of the transfer-function of the complete signal chain is the combination of both blocks or the product of all filter stages. One of the most relevant filter stages is that in front of the ADC, it helps to remove aliasing contribution introduced by the amplifier connected upstream.

Preferably, the amplifiers in the signal path are of low-noise type and highly linear. An amplitude linear signal path makes distance evaluation much easier because the distance evaluation becomes invariant versus amplitude.

Then a waveform-sampler 4, such as an analog-to-digital-converter, is used for digitalizing the pulse shape as waveform from the filtered electrical signal as time- and value-quantified digital data. The filter 3 is built in such a way that its transfer-function is of at least $7^{th}$ order, in particular $8^{th}$ or $14^{th}$ or even higher order, so that aliasing is sufficiently suppressed.

A computation means 5 is used for a numerical evaluation of the distance according to the pulse shape or a pulse shape representing numerical signature from the digital data, in particular with a resolution in time being orders of magnitude better than the time-quantisation interval of the waveform sampler. This is achieved by a numerical resampling of the pulse shape represented by the digital data, in particular according to the Nyquist-Shannon-Theorem as amplitude values at instances of time in-between the time-quantifying sampling-times when no actual value of the electrical signal had been sampled and digitalized by the waveform sampler 4.

High speed signal real-time processing is usually performed by using a FPGA, PLD or ASIC directly after the ADC.

The distance information evaluated according to the travelling time of the pulse to and from the target combined with the speed of light is provided on an interface for further usage.

Figure 2B:
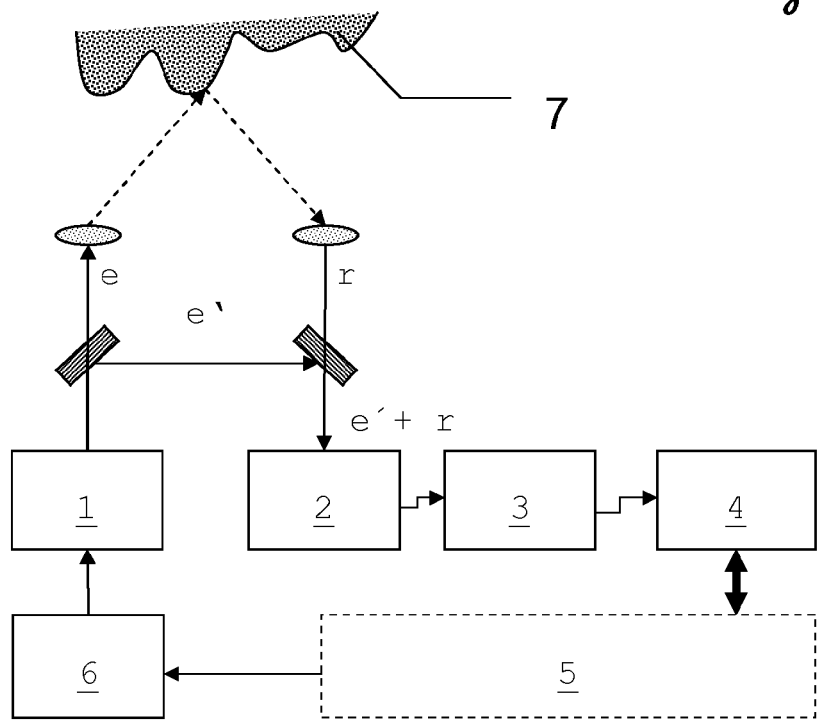

Another example for a possible variation of FIG. 2a as a special embodiment of the invention is shown in FIG. 2b, wherein a further transmission filter 6 for shaping the output-pulses of a transmitting laser 1 is introduced. By doing so the undesired ranges of frequency, known to result in aliasing, are already suppressed at the generation of the signal at first hand by the low-pass characteristics of the transmission filter. Thereby the receiving filter 3 already receives a signal with a rather weak frequency content outside of the Nyquist-band that would generate aliasing at the ADC 4.

In one special embodiment, the setup of FIG. 2b could also comprise a pulse-shaping-filter 6 with a corresponding matched-filter as subcomponent of the circuitry 3 after the receiver 2, as e.g. known from optical communication systems.

However, in most cases, short optical laser pulses e.g. shorter than 1 or 2 ns are advantageous for keeping time jitter low due to photon noise. A first pulse broadening will then occur in the photodiode and/or the receiver channel.

FIG. 3a shows the spectrum of an analog signal 31 (lower solid curve) and its digital representation 32 (upper dotdashed curve) sampled at fs=500*10$^6$ samples per second (fs) with different orders of aliasing-filters in comparison, in particular of 1$^{st}$ (upper diagram), 4$^{th}$ (middle diagram) and 6$^{th}$ (lower diagram) order. The filter used is a low-pass-filter with a corner—(also called 3 dB—) frequency of 80 MHz (BW), fg is the Nyquist-frequency equal to half of the sampling frequency fs, as known from theory.

The received undistorted analog signal 31 from the receiver 2 is drawn as a reference to show the effects of aliasing. With Filters of 1$^{st}$ order, the digital spectrum 32 differs from the real spectrum 31 nearly over the full spectral range, especially at higher frequencies. With a filter-grade of 4$^{th}$ order the frequencies in the range at and above fg are much better suppressed and it seems already to be in a tolerable range to sufficiently suppress aliasing. The usable bandwidth BW of the signal with damping less than 3 dB is about 80 MHz. As a result, for an exemplary sampling frequency of 500 MHz and a moderate distant corner frequency of the filter of 80 MHz, it looks that a filter of 5$^{th}$ to 6$^{th}$ order is sufficient to achieve sub-mm ranging accuracy.

In FIG. 3b a similar diagram as in FIG. 3a is shown, wherein the signal bandwidth BW is increased from 80 MHz to 120 MHz. The undistorted spectrum of the analog signal is denoted as 33 (solid line) and that of the sampled signal as 34 (dotdashed line). At the Nyquist rate fg, the 4$^{th}$ order filter is not anymore sufficient, the spectrum of the sampled signal 34 deviates from the analog curve 33—so there is still a visible frequency content at Nyquist rate. A 6$^{th}$ order filter is very close to fulfil the Nyquist criterion in the spectrum at the frequency fg and above. A deeper analysis shows that for the case of a corner frequency of 120 MHz and a sampling rate of 500 MHz (as above), a filter of 7$^{th}$ order would be appropriate. It shall be noted that the effects of finite bit-resolution of an ADC is not considered in those calculations.

Figure 6A:
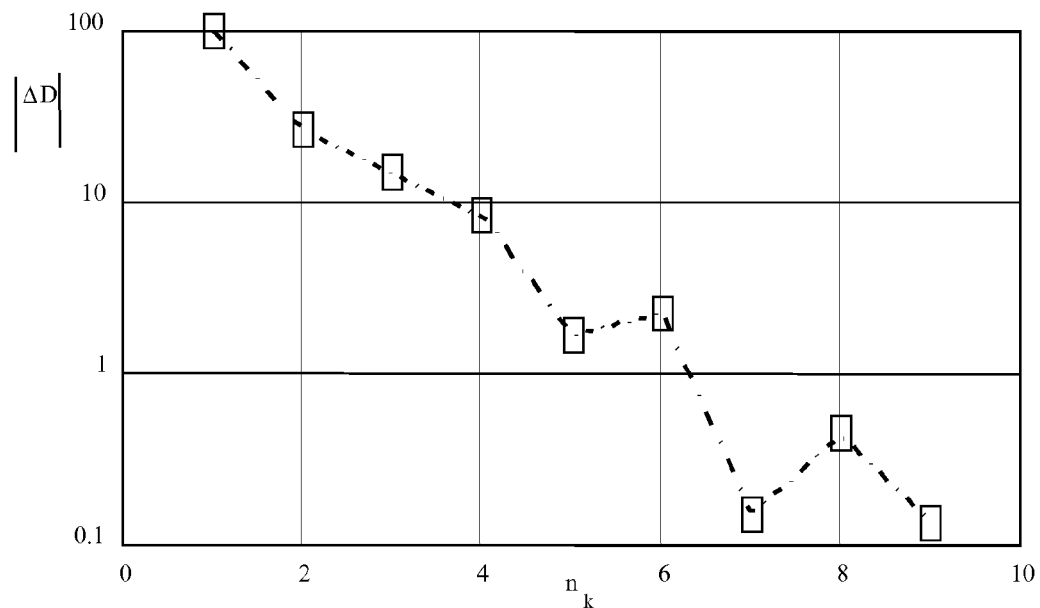
FIG. 6a shows a diagram wherein the achievable error in distance is plotted against the order of the filter to illustrate the unexpected effects of the present invention.

How big the influence of aliasing can be, if the filter-bandwidth, the sampling-rate and the pulse-width of the sent signal are not carefully balanced can be seen in FIGS. 6a and 6b and will be described further below.

As noted above, the presence of aliasing is usually hardly visible in a time-domain representation of the signal. When using a pulse-width of 5 ns, which corresponds to 750 mm in distance, the shape of the pulse has to be accurate to at least the factor of 1/1000 to achieve sufficient accuracy. A pulse distortion of 1%, which is hardly visible when observing the signals, would already lead to error in distance of 7.5 mm.

Figure 4A:
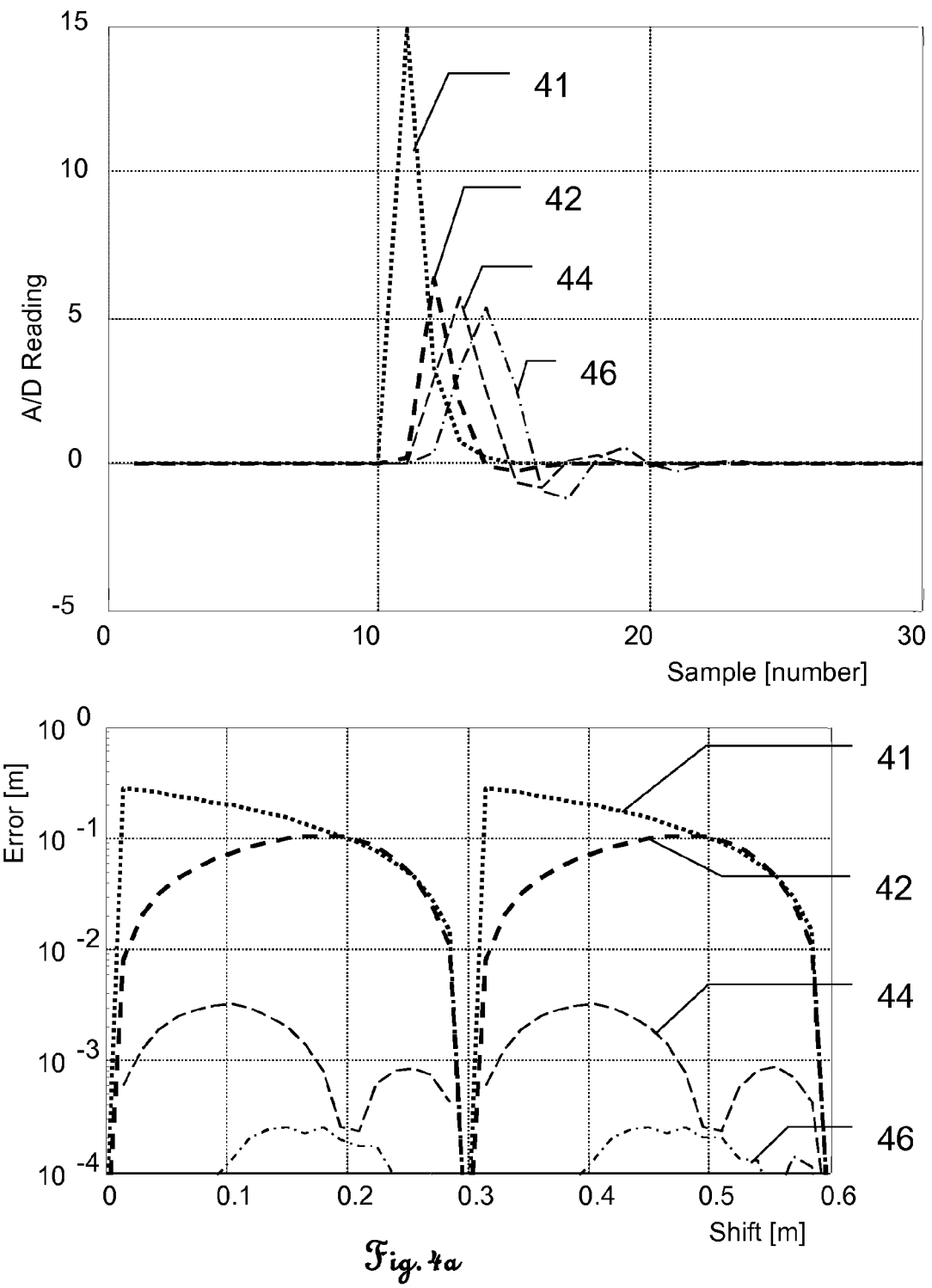
FIG. 4a shows a comparison of the time domain signals with different orders of filters and the periodical interpolation errors achievable to illustrate the effect of the invention.

FIG. 4a presents in the upper diagram a simulation of typical output-pulses filtered by a low-pass-filter of 1$^{st}$ to 6$^{th}$ order in time-domain. The corner frequency of the filter-chain is at 120 MHz, which is 48% of fg. Although the emitted laser pulse is extremely short (1 to 2 ns), the output signal at the output of the filter chain is broadened, such that the recorded waveform has sufficient sampling points (upper diagram). The curves 41, 42, 44 and 46 belong to filter order of 1, 2, 4 and 6 respectively.

The time-resolution of the pulses or a representative signature for it has to be unbiased in-between the sampling points to obtain a sub-mm resolution in distance. The lower part of FIG. 4a shows the distance-error for different orders of filters (curve labels correspond to labels in upper part of FIG. 4a) introduced by aliasing effects when interpolating the sampling intervals into sub-sampling-time, e.g. by using the inverse Fourier transform of the baseband frequency spectrum of the signal. For this interpolation the shape of the pulses is reconstructed to overcome the low time resolution of the underlying sampling interval to determine the distance. Obviously, any sub-sampling analysis can only bring accurate results if effects of aliasing are sufficiently suppressed by a filter with a sufficient high suppression factor.

FIG. 4b shows diagrams equivalent to FIG. 4a but with a reduced bandwidth BW of 80 MHz instead of the 120 MHz of FIG. 4a. The curves 41, 42, 43 and 44 now belong to filter order of 1, 2, 3 and 4 respectively. In case of BW of 80 MHz, the filter needed must be of 4$^{th}$ order whereas in the case of BW 120 MHz a 7$^{th}$ order filter is needed to achieve sub-mm accuracy with the sampler running at 500 MHz. Such diagrams can be used to choose a correct set of frequencies fs, fg and BW when designing the device. Again the curve labels in the upper part of FIG. 4b correspond to that of the lower part.

By an approximate analytic model, the relevant parameters and their influence on the accuracy of the distance-measurement will be further analyzed. For explanation of the underlying principles, one example of the influence of the aliasing effects on the distance-accuracy is now described in more detail:

Especially the phase-response in frequency-domain will be examined, as aliasing does influence both amplitude and phase of the signal. In frequency-domain, aliasing results in a folding of the frequencies above the half of the sampling-frequency fs, which half is also referred to as Nyquist-frequency fg, to lower frequencies. As known from sampling theory, the original spectrum of the analog signal is repeated periodically with multiples of fg. The resulting frequency spectrum of a sampled signal is the sum of all of these parts. Only if the spectrum of the original signal is zero outside the range of |fg|, no errors due to aliasing are introduced.

Devices according to the state of the art can not fulfill this requirement, as their filters of low order results in non neglectable frequency components outside of |fg|.

The phase-response of the filter is highly dependent on the order of the filter. The formula for the tangent of the phase-response of an analog impulse-signal after a filter of n$^{th}$ order is:

$$\tan(\phi(f)) := -\tan(n \cdot \arctan(2 \cdot \pi \cdot \tau \cdot f)) \qquad (3)$$

wherein n is the order of the filter and τ is inverse prop. to the bandwidth BW of the filter and f is the frequency of the signal.

In formula 4, an approximation of the phase-response of the filtered signal after a subsequent sampling at a rate of fs is given.

$$\tan(\phi_A(f)) := -1 \cdot \frac{\sin(n \cdot \arctan(2 \cdot \pi \cdot \tau \cdot f)) + Q^n \cdot \sin[n \cdot \arctan[2 \cdot \pi \cdot \tau \cdot (f - fs)]]}{\cos(n \cdot \arctan(2 \cdot \pi \cdot \tau \cdot f)) + Q^n \cdot \cos[n \cdot \arctan[2 \cdot \pi \cdot \tau \cdot (f - fs)]]} \qquad (4)$$

with $$Q(f, fs, \tau) := \sqrt{\frac{[(2 \cdot \pi \cdot \tau)^2 \cdot (f)^2 + 1]}{[(2 \cdot \pi \cdot \tau)^2 \cdot (f - fs)^2 + 1]}} \qquad (5)$$

wherein the newly introduced symbol fs represents the sampling-frequency and Q is the resulting frequency-dependent grade of mixing due to the sampling process.

Figure 5A:
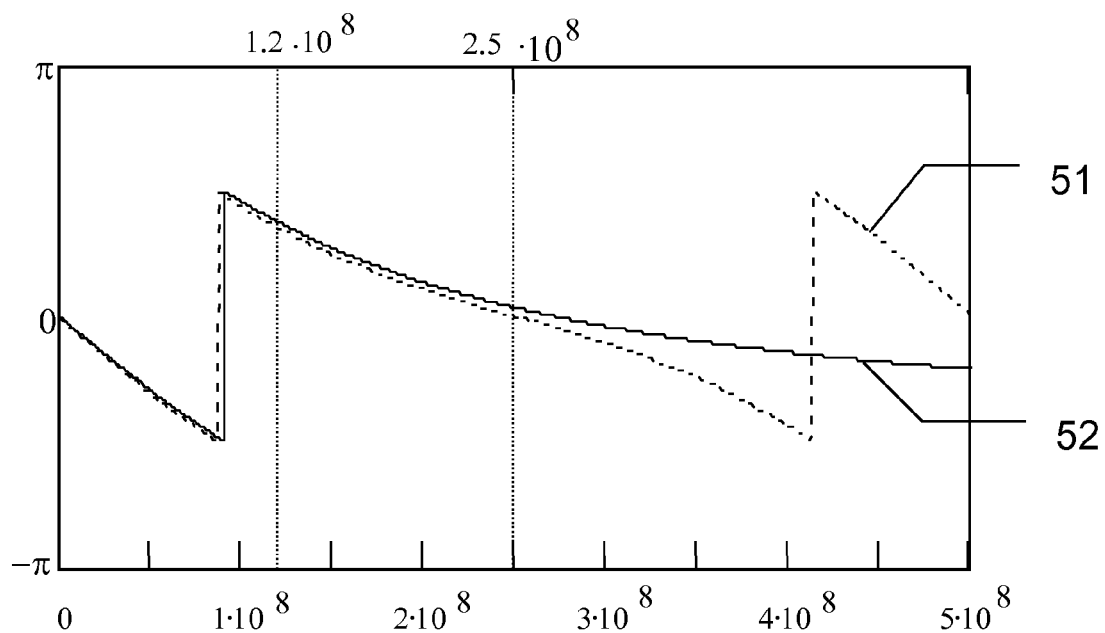
FIG. 5a shows an example of the phase of an analog and the corresponding digital signal over frequency with a low order filter as used in prior art.

FIG. 5a shows the difference of the phase-responses between the filtered analog signal 52 and the signal 51 sampled at a rate of 500 MHz according to the approximation of the equation (3) and (4). A filter of $3^{rd}$ order with a corner-frequency of 80 MHz is used therein. The phase error introduced by aliasing for frequencies greater than about 50 MHz is clearly visible and therefore a precise measurement of distance in the range of mm can not be achieved by this setup.

Figure 5B:
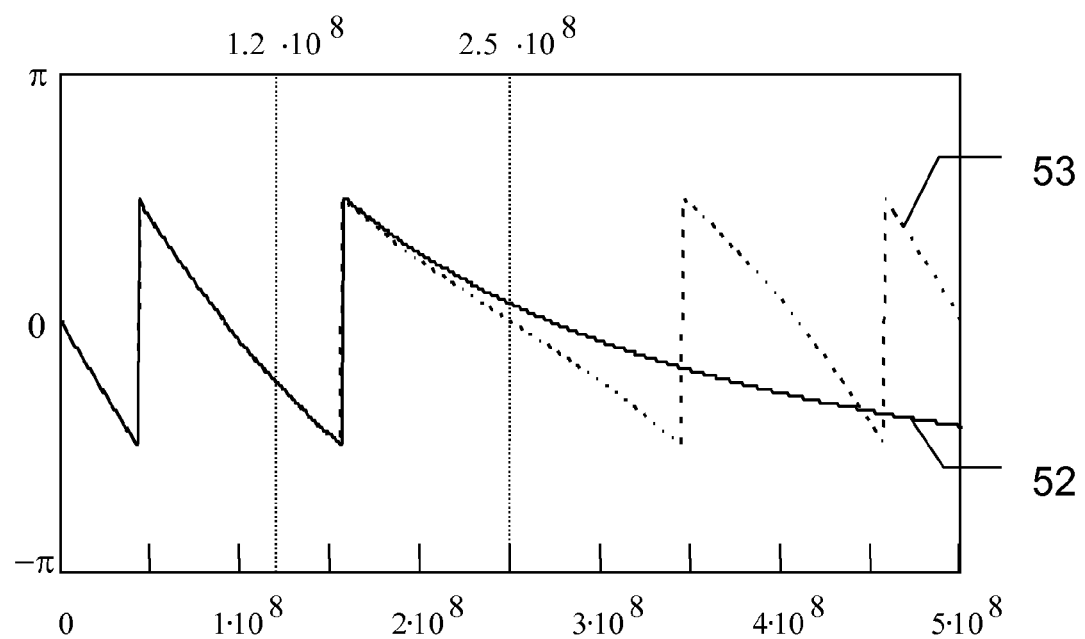
FIG. 5b shows an example of the phase of an analog and the corresponding digital signal over frequency with a high order filter according to the present invention.

A similar diagram as described above with the phase response of the filtered analog signal 52 and the sampled signal 51 is shown in FIG. 5b, whereby a filter of $6^{th}$ order and a bandwidth of 120 MHz is used. No effects of aliasing in the phase-response are visible for frequencies up to 120 MHz or even above, which is an indication for an accurate digital representation and reconstructability of the signal.

The influence of the phase- and group-delay onto the measured distance can be estimated by means of the equations (3) and (4) and by means of a signal-frequency $f_{center}$, assumed as dominant for the evaluation of distance. The deviation of distance to be expected due to the aliasing-effect dependent on the order of the filter is given in FIG. 6a.

On the horizontal scale, the order of the filter is given, while on the vertical axis the expected distance-error in mm is shown for a bandwidth of 120 MHz. The increase of the order of the filter clearly increases the distance-accuracy, whereby a filter of $7^{th}$ order is expected to result in errors clearly less than 1 mm.

Those approximation based values match quite well with the exact simulation results as shown in FIGS. 4a and 4b.

Figure 6B:
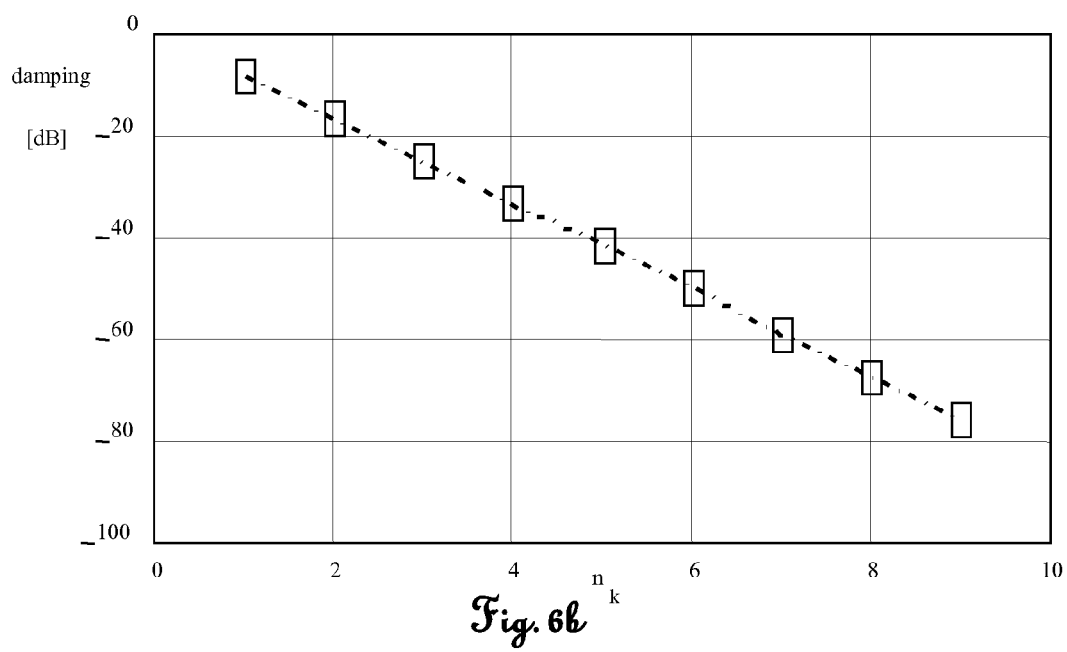

FIG. 6b shows the damping of a $n^{th}$ order filter for the mirror-frequency $f_g$-$f_{center}$ resulting from the sampling process. A $6^{th}$ order filter e.g. damps the signal at this frequency and above by at least 60 dB, whereby an accuracy below 1 mm is achievable even when the BW of 120 MHz corresponds to 48% of fg.

As the distance-information contained in the signal increases proportionally to the frequency, it is desirable to use a filter having a transfer-function with a steep slope at the corner frequency, as e.g. achievable by a Tschebyscheff-, Inverse-Tschebyscheff-, elliptic-, or Cauer-Filter, but also with properly designed Butterwort-Bessel- or Gauss-Filters an improvement of the measurement accuracy can be achieved, especially as the latter have the advantage of a comparably flat gain in the passband.

The filter can not only be implemented by using discrete components since the usage of pre-built, integrated electronic components for that purpose, having desired filtering characteristics, either as passive or active components, as well as filters based on acoustic-surface-waves, piezo-crystals, ceramic, or other filter-components known in electronics can ease the design process.

According to the invention, the filtering of the received signal in a WFD with a high order filter results in an unexpected improvement of accuracy. An important factor thereby is the possibility for reconstructing and/or interpolating the shape of the original analog signal according to its digital representation which allows a numerical analysing of the shape of the pulse with a time-resolution below the sampling time. Thereby, the accuracy of time of flight measurement can be improved, while still using affordable ADCs with moderate sampling rates such as 200 Mhz. Slow ADCs are in general cheaper and have usually a resolution of more than 12 bit.

The dominant part of the signal used to determine the distance must be inside of the Nyquist-band m*fs+/−|fg| (m is an integer) and especially the upper frequencies of this band should not be dampened too much because they contain valuable distance information. Therefore an overall filter-force of high order is introduced into the signal path. Especially a low-pass- or band-pass-filter of typically about $5^{th}$ order or higher is used e.g. up to order 14. Whereas in prior art only filters of $1^{st}$ to $3^{rd}$ order are known and used because of the reasons explained above.

A further embodiment of the invention is to additionally shape the transmitted signal that is sent out by the laser according to the desired frequency profile by a filter. Thereby the received signal already comprises an advantageous frequency profile with regard to the signal energy outside the Nyquist-frequency. Such an approach can be compared with principles of using a pulse-shaping-filter for transmitting and a corresponding matched-filter for receiving as know in data communication systems.

As laser-diodes provide a bandwidth above 1 Ghz such a reduction of the frequency-spectrum of the sent out pulse can be done. For baseband operation the spectrum of the emitted pulse of radiation is thereby limited to the first Nyquist-band of the receiving unit. Alternatively when using a band-pass filter with a center frequency somewhere inside the received energy spectrum, signal recording can be performed in a higher Nyquist-band.

Preferably, the laser is operated in a burst-mode emitting a pulse train of short pulses to achieve a more efficient operation in a higher Nyquist-band. In this case, the appropriate receiver filter would be a bandpass filter centered around the burst-frequency.

By the introduction of a filter according to the invention, in the process of system-identification the calibration of the actual shape of the pulse is not the main criteria any more. The dominant purpose of such a calibration is now more related to the amplitudes (also known as range-walk vs signal amplitude), since amplitude-nonlinearities introduced by the electronics can not be compensated by the filter. By also taking those nonlinearities into account, a further improvement of the distance measurement accuracy is possible.

One embodiment uses a variable optical attenuator in the reference path e' of FIG. 2. In the case of similar amplitudes of the pulses e' and r, nonlinearities are equally expressed in both pulses such they do not influence the measured time-of-flight. Another method for amplitude compensation is to use the variable optical attenuator for building up a look-up table containing the range-walk data versus signal strength. If necessary, this look-up table can be actualized before every measurement run by stepping through the complete signal-dynamic amplitude-range. Also a compensation of temperature can be optionally implemented as well.

According to another embodiment of the invention, especially the usage of a band-pass-filter can bring some advantages in comparison to a low-pass-filter, as the absence of a DC-component eases the use of differential signal transmission, as often used by analog-to-digital-converters to improve the signal-quality.

By doing so it is also possible to use undersampling, which means to use any Nyquist-band, not necessarily the first one as it is described in the examples above in detail, since the folding-characteristics of the sampling process is periodically repeated.

The filter can be located at different positions in the receiving path in-between the photodiode and the ADC, especially before or after an amplifier or both. Since amplifiers are known to have filter properties, the overall filter block is distributed along the signal channel, whereas the photodiode or transimpedance amplifier builds the first filter stage.

Figure 7:
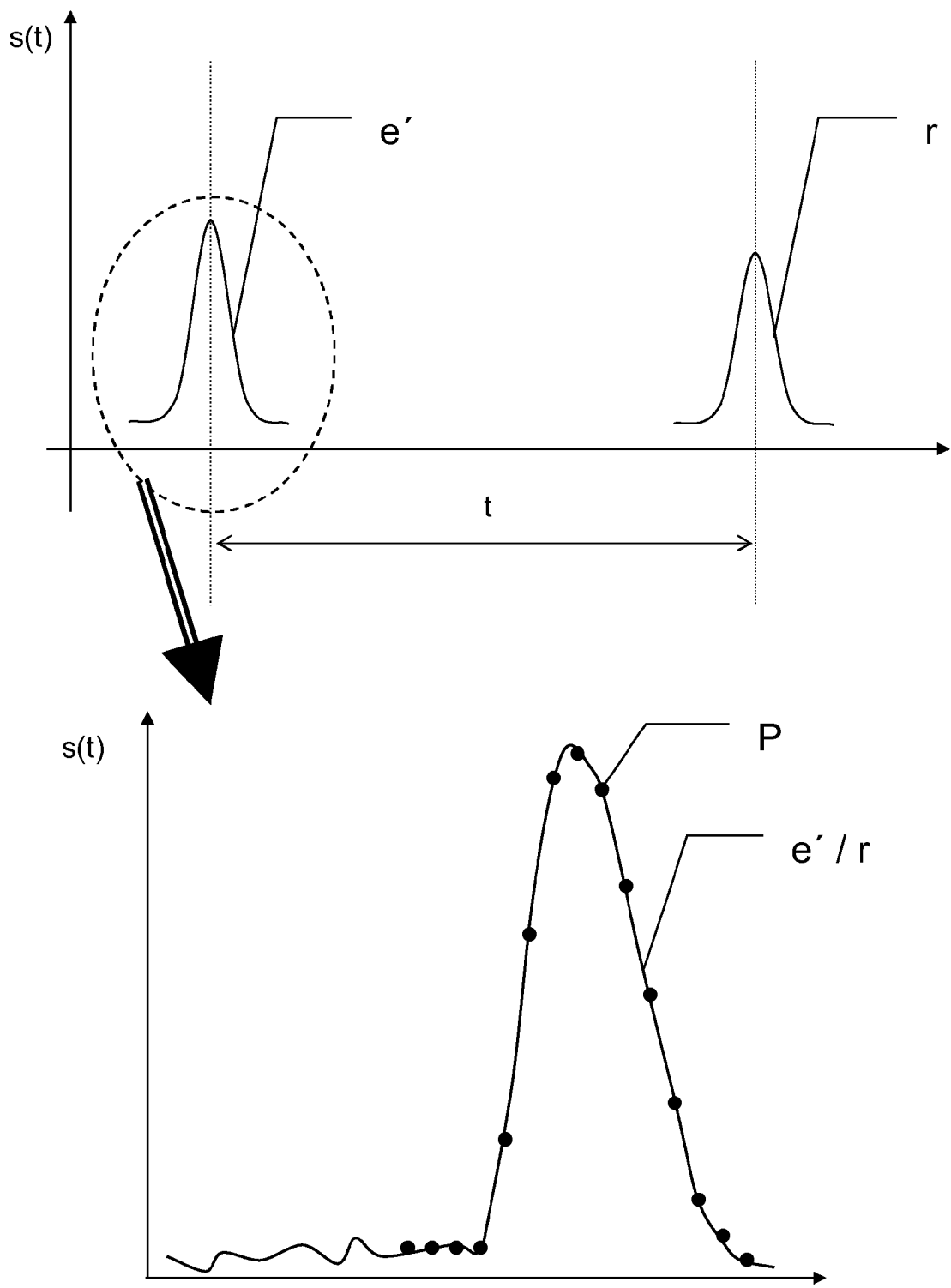
FIG. 7 shows an example of pulses and the principle of time of flight distance measurement with an illustration of the pulse-shaped sampling in a WFD according to the invention.

In FIG. 7 one can see an example of the pulses e' and r at the receiver 2, both being part of radiation e that is emitted by the transmitter 1, but travelled the reference-respectively the target-distance and the time of flight t defined in-between them. The lower part is a zooming view of such a pulse wherein the sampling points P of the shape of the signal digitalized by the ADC are marked with black dots. According to the fulfilled Nyquist-theorem the exact shape of the filtered signal can be fully reconstructed and also resampled with a sub sampling-time-interval resolution without loss of accuracy.

A method for time-of-flight t estimation is performed through comparing the two pulses by minimizing the residuals of corresponding samples. Generally, the set of signal samples of the two pulse-like waveforms differ in sampling phase, the residuals are not at their absolute minimum and the time-of-flight estimation is biased. With the assumption of the validity of Nyquist-Shannon sampling theorem, the waveforms may be resampled to minimize the residuals. To simplify the estimation process, it is sufficient to resample only one pulse-like waveform. Another way to keep computation small is the signal resampling or reconstruction with a windowed digital filter-kernel of short length, where samples are taken only in a time window with finite length comprising the pulse shape.

The merit function to be minimized can for example look like:

$$residuum = \Sigma(se'(m*Ts) - sr(n*Ts-t))^2.$$

whereas the start pulse or reference pulse "e'" serves as time reference while the stop pulse "r" is time shifted by the time delay t. The time delay t is obtained by shifting the time continuous pulse shape that has been reconstructed from the original stop pulse.

Wherein:
se'(x) is the digital data of the pulse shape of the signal "e'" which traveled by the reference path at time x,
sr(x) is the digital data of the reconstructed pulse shape of the signal "r" which traveled by the reference target path at time x,
Ts is the sampling time,
$\Sigma$ is the sum over the pulse shape or a representative pulse portion,
t is the time shift in sub sampling time accuracy representing the time of flight to be determined,
n are the original samples of the pulse shape of the "r" signal,
m are the original samples of the pulse shape f the "e'" signal.

In the example above, the shape of se' is resampled, but also the shape of sr or both shapes can be resampled in other embodiments.

The least square minimizing iteration of this residual minimizing procedure is done as long the residuum will get smaller or be above a predetermined threshold. At the end of this algebraic resampling process the interpolation time is known to a precision of sub-picoseconds.

The step of determining the distance can e.g. be done by using a least square minimizing algorithm for the residuals between a first pulse-portion of a first wave-form and a second pulse-portion of a second wave-form being resampled at resampling points which are correspondent to the ones of the first waveform. In particular, the resampling points of the second waveform being at the same points in time as the sampling times relative within the similar first waveform.

Alternatively also a residual minimizing procedure between a numerical signature derived from a first pulse-portion of a first wave-form and a numerical signature derived from a second pulse-portion of a second wave-form can be calculated, wherein the second wave-form is resampled for minimizing the residuals.

As explained above, the distance is evaluated according to an elapsed-time in-between at least two of the pulse shapes by matching the pulse shapes, which are represented by the digital data. The elapsed-time in-between the at least two pulse shapes is evaluated, wherein at least one of the two pulse shapes is resampled to achieve sub quantification-time resolution, in particular wherein the elapsed-time is determined as a time-alignment of the of the pulse shapes relative to each other so that the similarity of the pulse-shapes is maximized.

In the case of windowing more accurate distance estimations are achieved when both waveforms are resampled to a phase-equivalent set of samples additionally with a selected phase to the pulse location. Instead of comparing the residuals of the samples of the pulse-shapes, a pulse-shape representing numerical signature from the digital data can be taken for each waveform. Again time-of-flight t estimation is performed through minimizing the residuals of the corresponding signatures by resampling at least one of the waveforms.

Without the effects of aliasing it is possible to achieve a time resolution below the sampling time, as the shape of the signal in-between the sampled points is accurately reconstructable, theoretically even up to an arbitrary resolution. As both pulses travelled an equal path expect the target distance, the environmental influences on the signals are equal too therefore they can be well suppressed and distance accuracy is improved.

The invention claimed is:

1. A highly accurate, electro-optical time of flight distance measuring device for determining a distance to a target, comprising:
a transmitter for sending out a pulse shaped optical radiation to the;
a receiver for an optical return signal, which comprises parts of the optical radiation scattered back from the target, built for turning the optical return signal to an electrical signal;
a filter with a transfer-function for filtering the electrical signal;
a waveform-sampler, as an analog-to-digital-converter, for digitizing the pulse shape from the filtered electrical signal as time- and value-quantified digital data;
a computation means for a numerical evaluation of the distance according to the pulse shape or a pulse shape representing numerical signature from the digital data, with a resolution in time being higher than the sampling interval of the waveform-sampler by numerical resampling of the pulse shape represented by the digital data, wherein the filter is built in such a way that its transfer-function is of at least $7^{th}$ order or higher order so that aliasing is suppressed,
wherein the computation means for a numerical evaluation of the distance according to the pulse shape or a pulse shape representing numerical signature from the digital data, with a resolution in time being higher than the sampling interval of the waveform-sampler by numerical resampling of the pulse shape represented by the digital data according to the Nyquist-Shannon-Theorem as amplitude values at instances of time in-between the time-quantifying sampling-times when no actual value of the electrical signal had been sampled.

2. An electro-optical distance measuring device according to claim 1, wherein the pulse shaped optical radiation is a pulse modulated laser beam, the receiver includes a photodiode or avalanche photodiode, and the filter includes an analog-signal lowpass or bandpass filter.

3. An electro-optical distance measuring device according to claim 1, wherein the filter is built in such a way that its transfer-function is of at least 14 or higher order so that aliasing is suppressed.

4. An electro-optical distance measuring device according to claim 1, wherein the filter has a suppression rate of at least 60 dB for aliasing producing frequencies of the electrical signal being outside of a selected Nyquist band of the time-quantification of the waveform-sampler.

5. Electro-optical distance measuring device according to claim 1, wherein the filter is as a Butterworth-, Tschebyscheff-, inversed Tschebyscheff-, Cauer-, elliptic-, Gauss-, or Bessel-filter, either active or passive, implemented as an integrated circuit or by discrete components.

6. An electro-optical distance measuring device according to claim 1, wherein the filter is implemented as a surface acoustic wave, ceramic, or piezo-filter.

7. An electro-optical distance measuring device according to claim 1, wherein the filter is directly connected to the input of the waveform-sampler, so that the filter acting as anti aliasing filter is the last circuitry block in the signal path before the waveform-sampler.

8. An electro-optical distance measuring device according to claim 1, wherein there is a transmission filter at the transmitter for shaping the sent out optical radiation.

9. An electro-optical distance measuring device according to claim 8, wherein the transmission filter is built for low-pass filtering the bandwidth of the pulse of the sent out optical radiation such that frequency components resulting in aliasing are reduced also at the transmitter.

10. An electro-optical distance measuring device according to claim 1, wherein the device further comprises at least one amplifier.

11. An electro-optical distance measuring device according to claim 1, wherein the device further comprises at least one amplifier with adjustable gain, and/or at least a further filter.

12. An electro-optical distance measuring device according to claim 1, wherein the waveform-sampler has a sampling rate in the range of 100 mega-samples to 10 giga-samples per second for time quantification and a value-resolution of 6 to 24 bit for value quantification.

13. An electro-optical distance measuring device according to claim 1, wherein a part of the optical radiation from the transmitter is fed to the receiver along a known reference path as reference signal, and the return signal and the reference signal are combined by a beam combiner and sampled simultaneously or one after the other by a selective admission to the waveform-sampler.

14. An electro-optical distance measuring device according to claim 1, wherein the distance is evaluated according to an elapsed-time in-between at least two of the pulse shapes by matching the pulse shapes, which are represented by the digital data, and evaluating the elapsed-time in-between the at least two pulse shapes, wherein at least one of the two pulse shapes is resampled to achieve sub quantification-time resolution.

15. An electro-optical distance measuring device according to claim 14, wherein the elapsed-time is determined as a time-alignment of the of the pulse shapes relative to each other where the similarity of the pulse-shapes is maximized.

16. Method for signal evaluation in a wave-form-digitizing distance measuring unit according to claim 1 comprising the steps of:
    sending out pulses of optical radiation in the visible or infrared range to a target object;
    receiving at least parts of the sent out optical radiation scattered back by the target object as an electrical signal;
    digitizing a wave-form of the electrical signal in a sampling-time-interval;
    determining a distance to the target object based on the digitized wave-form according to the time-of-flight method with a resolution of time being higher than the sampling-time-interval by numerical reconstructing the digitized wave-form in a resampled representation according to the Nyquist-Shannon-Theorem as amplitude values at instances of time in-between the sampling-time-interval when no actual value of the electrical signal had been sampled; and
    filtering the electrical signal with a transfer-function of at least 7th order before the digitalisation in such a way that aliasing effects in the digitalisation are suppressed.

17. A method for signal evaluation according to claim 16, wherein the filtering of the electrical signal is suppressing frequency-components of the electrical signal responsible for aliasing effects in the digitalisation by at least 60 dB.

18. A method for signal evaluation according to claim 16, wherein the step of determining the distance is carried out by matching of at least a first and a second of the digitized wave-form for time-of-flight determination wherein at least one of the first and/or second wave-form is resampled to achieve the sub sampling-time-interval resolution.

19. A method for signal evaluation according to claim 18, wherein:
    the step of determining the distance comprises a least square minimizing algorithm for the residuals between a first pulse-portion of the first wave-form and a second pulse-portion of the second wave-form being resampled at resampling points in time which are correspondent to the sampling times of the first waveform relative within the shape of the wave-form; or
    a residual minimizing procedure between a numerical signature derived from a first pulse-portion of the first wave-form and a numerical signature derived from a second pulse-portion of the second wave-form wherein the second wave-form is resampled for minimizing the residuals.

20. A method for signal evaluation according to one claim 16, further comprising calibrating the digitized wave-form according to a correction-table or -function previously recorded in an identification process.

* * * * *